(12) United States Patent
Chang

(10) Patent No.: US 10,709,062 B2
(45) Date of Patent: Jul. 14, 2020

(54) LINE TRIMMER AND SHREDDER APPARATUS

(71) Applicant: Michael Ting-Kao Chang, Huntsville, AL (US)

(72) Inventor: Michael Ting-Kao Chang, Huntsville, AL (US)

( * ) Notice: Subject to any disclaimer, the term of this patent is extended or adjusted under 35 U.S.C. 154(b) by 136 days.

(21) Appl. No.: 16/141,514

(22) Filed: Sep. 25, 2018

(65) Prior Publication Data

US 2020/0093059 A1    Mar. 26, 2020

(51) Int. Cl.
| | | |
|---|---|---|
| *A01D 34/416* | (2006.01) |
| *B02C 19/00* | (2006.01) |
| *A01D 34/90* | (2006.01) |
| *E01H 5/09* | (2006.01) |

(52) U.S. Cl.
CPC ..... *A01D 34/4166* (2013.01); *A01D 34/4165* (2013.01); *A01D 34/4168* (2013.01); *A01D 34/90* (2013.01); *B02C 19/00* (2013.01); *E01H 5/094* (2013.01)

(58) Field of Classification Search
CPC .............. A01D 34/4166; A01D 34/416; A01D 34/4165; A01D 34/4168; A01D 34/90; B02C 19/00; E01H 5/094
See application file for complete search history.

(56) References Cited

U.S. PATENT DOCUMENTS

| | | | | |
|---|---|---|---|---|
| 4,086,700 A | * | 5/1978 | Inada | A01D 34/4166 30/276 |
| 5,276,969 A | * | 1/1994 | Luick | A01D 34/416 30/276 |
| 5,493,785 A | * | 2/1996 | Lawrence | A01D 34/4166 30/276 |
| 6,032,442 A | * | 3/2000 | Paolo | A01D 34/416 172/13 |
| 6,363,616 B1 | * | 4/2002 | Kreissle | A01D 34/416 30/276 |
| 6,842,984 B1 | * | 1/2005 | Grant | A01D 34/4168 30/276 |
| 10,349,576 B1 | * | 7/2019 | Jones | A01D 34/005 |
| 2003/0155137 A1 | * | 8/2003 | Iacona | A01B 45/026 172/13 |
| 2012/0066912 A1 | * | 3/2012 | Ferrell | A01D 34/4166 30/276 |

(Continued)

*Primary Examiner* — Christopher R Harmon
(74) *Attorney, Agent, or Firm* — Cynthia Rena Wright

(57) ABSTRACT

The invention is a multi-tiered line trimmer and shredder apparatus using a number of individual pre-molded or pre-cut nail head string lines. Whenever the engine or motor is running, the apparatus rotates the nail head string lines generating cutting power designed to utilize multiple functions, such as trimming grass or weeds, clearing vegetation by shredding or mulching it, or removing snow. The apparatus consists of a base, cylindrical body, nail head string lines, and cover. The base attaches to a drive shaft or directly to an engine or motor. The cylindrical body is hollow, has holes throughout its wall that may be the same or variable sizes. The nail head string lines are inserted into the holes. The cover is used to cover the cylinder body, and to secure the "nail head" portion of the nail head string lines within the cylindrical body while the apparatus is in use.

6 Claims, 8 Drawing Sheets

(56) References Cited

U.S. PATENT DOCUMENTS

2016/0143220 A1* 5/2016 Child ................ A01D 34/4166
                                                    30/276
2018/0020614 A1* 1/2018 Alliss ................ A01D 34/4163
                                                    30/276
2018/0177122 A1* 6/2018 Skinner ............. A01D 34/4163
2020/0060080 A1* 2/2020 Nevels .............. A01D 34/4167

* cited by examiner

LINE TRIMMER AND SHREDDER APPARATUS

FIELD OF INVENTION

The present invention provides a novel grass or weed trimmer apparatus with a cylindrical body assembly using multiple trimmer lines that may be used for landscaping maintenance, gardening, or snow accumulation removal.

BACKGROUND OF INVENTION

The current market offers two types of gas and electric string line trimmers. The first type is a string line trimmer that has an automatic feed; the second type is a bump feed line trimmer that one hits to a hard surface to force the line out of the spool.

An automatic line feed trimmer wastes anywhere from eight to ten inches of line when it reaches the last foot of line on the spool, and the line often flies off the device with no notice.

The provisional patent U.S. Patent No. 2017/0006775 A1 is a device that is a combination blade and cord weed cutter-trimmer head device. The combination is a string trimmer that incorporates a solid blade head and operates on gas or electricity. The device incorporates a string trimmer head of any available design (such as the bump and feed, automatic, manual feed, or fixed string) with a metal blade. During the operation of the device, the metal blade can cut the thicker weeds or brush encountered, and the cord trimmer can cut the remaining thinner weeds. As with existing string line trimmers, the user may have to stop in the middle of the trimming project to either re-thread the spool or manually attach a new spool of string line to the trimmer.

There are many additional types of trimmers and cutting devices, such as U.S. Pat. No. 6,722,040, the rotary grass trimming device of U.S. Pat. No. 4,862,682, and a head for a trimmer and attachment of U.S. Patent 2014, 0150267 A1.

The above are examples of different types of trimmers and cutting devices that have been published, but are different from this invention even though the concept is the same: to cut weeds or grass. However, none actually shred the weeds or grass like this invention. There is a need for an apparatus that can reduce the waste of the trimmer line, and can shred the grass or weeds, thus saving time for the user.

Accordingly, there is a need for a new apparatus that can reduce the waste of string line and operate more efficiently in performing different functions such as a trimmer, mulcher, and snow accumulation remover. Such a device would be lightweight and be able to trim, mulch, and remove snow accumulation. Ideally, the apparatus would be attached to an engine, a motor, or a drive shaft while not requiring any specialized installation. Ideally, the apparatus would easily adjust to be a trimmer, to be a mulcher, or to be a snow accumulation remover.

SUMMARY OF THE INVENTION

The apparatus provides multiple functions and maximizes these functions to their fullest capacities to efficiently trim, shred, or mulch grass and weeds, or even remove snow accumulation. The apparatus provides line trimmer and shredder functions in one apparatus.

The four functional elements of the apparatus are: a base, a cylindrical body, a number of pre-molded nail head strings, and a cover. These four elements are joined together to form the apparatus.

The base of the apparatus interfaces with the drive shaft or directly attaches to an engine or motor. It cannot be decoupled from the body of the apparatus because both are molded into one piece. In general, a drive shaft has two ends: one end provides a "square head" to interface the engine or motor; the other end provides a male hexagon nut to which a tool head can attach. The engine or motor can be powered by any type of energy source such as gas, battery, solar, electric, and so on. The drive shaft is just like an extension of the engine or motor. Therefore, the apparatus is able to attach to any drive shaft, or directly to an engine or motor. Since the center core of the base has a female hexagon nut, it can adjust and adapt to a male hexagon nut at the end of a drive shaft of any length. This hexagon nut assembly design makes the apparatus follow the spin of the engine or motor. The design uses a retainer placed inside of the bottom center of the base to prevent the apparatus from decoupling from the drive shaft or engine or motor when it is spinning.

The cylindrical body of the apparatus is a cylinder shaped component. It is hollow, and the walls have rows of holes vertically and horizontally that may be reinforced with metal or composite material, or may be equipped with eyelets for the holes. The holes can be the same size or vary in size to accommodate nail head string lines of different thicknesses. The user inserts the pre-molded or pre-made ornamental nail head string line into the desired number of holes on the body of the apparatus. The apparatus allows the user to choose the number, thickness, and length of string lines to use for a specific task.

The ornamental nail head strings are pre-molded or pre-made string lines. One end of the string has a "nail head", and its dimension has to be larger than the size of the cylindrical body hole to prevent the string from being ejected from the cylindrical body when the apparatus is spinning. The other end of the nail head string line is the line segment. The line segment can be of any length and of any thickness that fits through the cylindrical body holes. The nail head strings are inserted into the holes of the cylindrical body to perform a "cutting" function when the apparatus is in use. The more strings are used in the task, the more cutting power will be generated.

The cover of the apparatus is used to cover the cylindrical body and to secure and hold the "nail head" portion of the nail head strings within the cylindrical body when the apparatus is operating. The cover of the apparatus has two prongs and one center pipe. Whenever the apparatus is spinning, the prongs lock and hold the apparatus securely in place, and the center pipe balances the apparatus as it spins.

The invention is a multi-line tiered apparatus that employs numerous pre-molded or pre-made nail head string lines, that whenever the engine or motor is started, the apparatus will rotate, and the nail head strings will generate the cutting power. The apparatus operates more efficiently than current trimmers on the market when used to clear weed and vegetation areas, or used in snow accumulation removal.

Other Features Include:

a. Low cost. It is a spinning apparatus that uses a power source or engine to spin, and turns the spinning power to string cutting power. It is cost effective because it has no need for an inner or outer spool line or any string line reels. The apparatus functions replace the functions of the inner and outer spools of existing trimmers.

b. No learning curve. One has no need for specialized training to use the apparatus or to learn how to spool or wind string line reels. Replacing string lines and string line spools can be a hassle in existing trimmers; it has to be improved or eliminated.

c. Simple to use. The user inserts nail head string line into as many of the holes on the cylindrical body of the apparatus as needed for the desired function.

d. Powerful. The apparatus has more cutting power since the number, thickness, and length of string lines used for trimming is chosen by the user. Since the string line in a trimmer is just like a blade, the more string lines applied, the better the cutting power. In this invention, the string trimmer spinning head provides a customizable number and size of holes to hold nail head string lines for either the trimmer function, the mulching application, or the snow accumulation removal.

e. Reliable and durable. When the power source or engine is started, the apparatus spins and utilizes the nail head string lines to cut grass or weeds. The string lines on the cylinder body do not impact or impinge the power source or engine while it is running: this makes the apparatus more durable and reliable.

f. Productive. When the apparatus is used as a shredder, it is able to produce grass or weed mulch, which can be reused in landscaping or a garden as natural fertilizer or compost for the soil. Since the apparatus has no wheels, the apparatus can maneuver around difficult areas and hard to reach areas where a lawnmower cannot reach.

BRIEF DESCRIPTION OF THE DRAWINGS

The present invention on Sheet 1 will be more fully understood by reference to the following detailed description when read in conjunction with the attached drawings, wherein like reference numerals refer to like elements, and wherein.

DETAILED DESCRIPTION

Before any independent embodiments of the invention are explained in detail, it is to be understood that the invention is not limited in its application to the details of construction and the arrangement of components set forth in the following description or illustrated in the following drawings. The apparatus is capable of other independent embodiments and of being customized in various ways. Also, it is to be understood that the phraseology and terminology used herein is for the purpose of description and should not be regarded as limiting.

Figure 1:
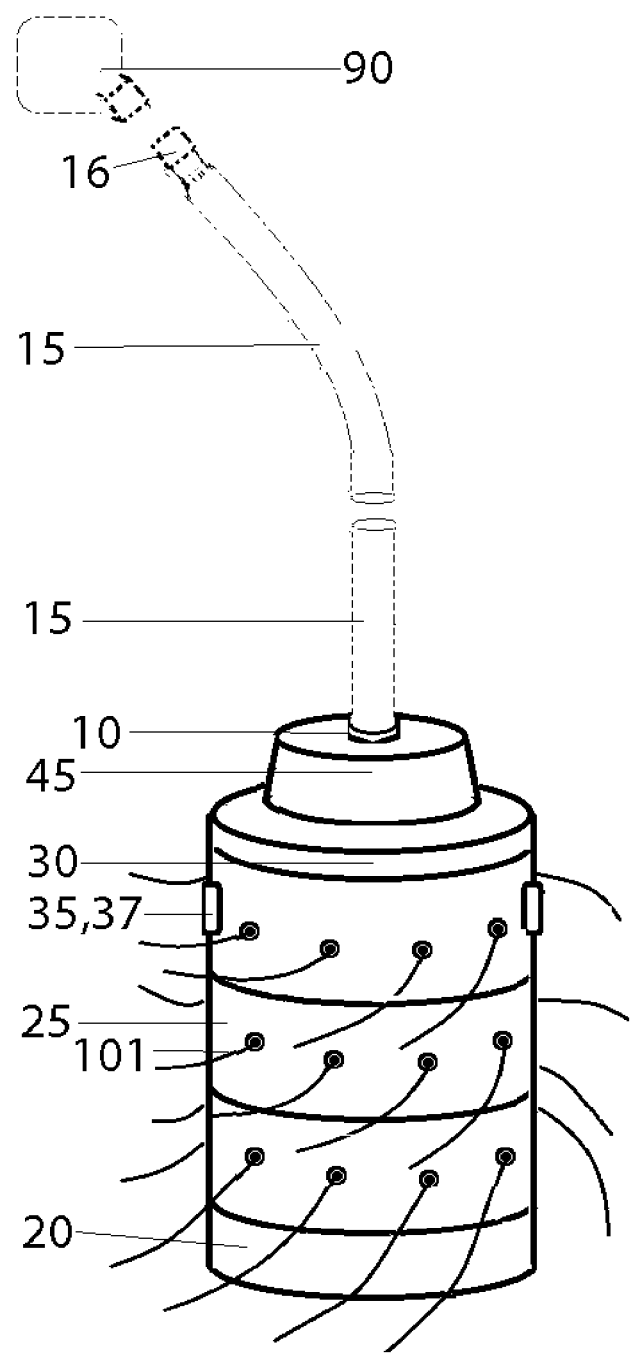
FIG. 1 on Sheet 2 is a concept view of external interfaces and the structure of the present apparatus.

FIG. 1 is a conceptual view of external interfaces and the structure of the present apparatus. The dotted line objects are external interfaces, and the solid line object is the present apparatus. The dotted objects in 90 include the power switch, power sources, initiators, motor or engine, and a curved drive shaft 15 and a square end element 16. The solid object is the present apparatus, which consists of functional elements that are a base 30, female hexagon nut 45, a cylindrical body 25, a number of nail head strings 101, and a cover 20. The base 30 and female hexagon nut 45 attaches to a drive shaft (10, 15) or may be molded with a drive shaft providing a square end element 16 to attach an engine or motor 90 directly. The cylindrical body is hollow and has many holes on it, and the holes can be the same or vary in size. The nail head strings 101 are inserted into the holes. The cover 20 is used to cover the cylindrical body and to hold the "nail head" portion of the nail head strings within the cylindrical body 25.

In general, the sequence to make the apparatus run is as follows:

1. A user turns on a power switch to engage the power source. The power source can be either gas, battery, solar, and/or electric power.

2. The ignition starts the motor or engine, and makes the motor turn.

3. The upper end of the drive shaft has a "square" shape end 16, which can be attached to the motor or engine 90. Hence, when the motor or engine runs, the drive shaft 15 will also turn.

4. The lower end of the drive shaft has a hexagon male bolt 10 or its equivalent. The apparatus provides a hexagon female functional element 45 to adapt and fit the hexagon male bolt 10 at the end of the shaft.

5. The conclusion from above steps: Whenever the engine or motor is started, the apparatus will rotate, and the nail head strings will generate the cutting power. FIG. 1 provides the conceptual view of the overall design of how the apparatus is attached to the drive shaft and how to use the power source or engine with a drive shaft.

Figure 2:
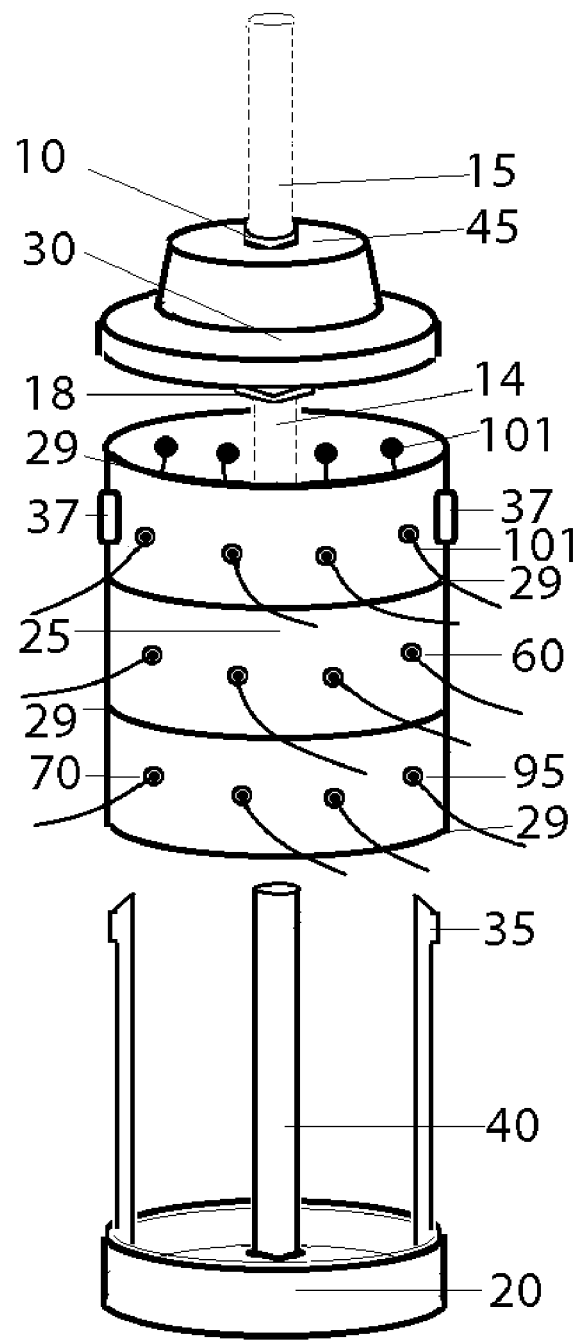
FIG. 2 on Sheet 3 illustrates an exploded side view of the four functional elements of the present apparatus.

FIG. 2 illustrates a side view of the four functional elements of the present apparatus. The apparatus is shown in an exploded view with the four basic elements and how they connect to each other: the base 30, the cylindrical body 25, a number of pre-molded or cut nail head string lines 101, and the cover 20. The exploded view displays how each of the four elements lines up with the others in the apparatus.

Figure 3:
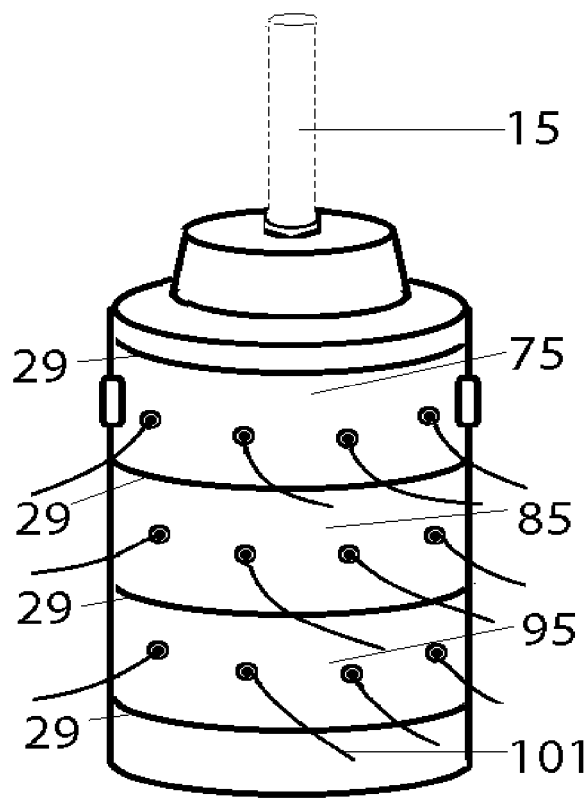
FIG. 3 on Sheet 4 is a side view of the apparatus that shows all of the eyelet holes filled with pre-molded or pre-cut nail head string lines.

FIG. 3 is a side view of the apparatus. It shows the apparatus when attached to the drive shaft and utilizing all the riveted eyelet holes (60, 70) with the ornamental nail head strings 101 to display the overall concept.

Figure 4:
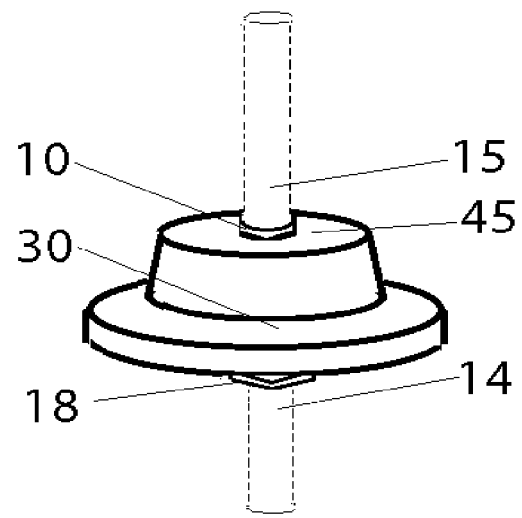
FIG. 4 on Sheet 4 is a detailed side view of the base of the apparatus.

FIG. 4 is an exploded side view of the base of the apparatus. The base 30 of the apparatus interface may use a curved or straight drive shaft 15 that may be of any length, fixed or adjustable, threading through the base and attached with a hexagon male bolt 10 and female hexagon nut 45 located at the top of the base to make the base rotate.

In order to keep the apparatus from separating from the drive shaft or engine or motor, the apparatus uses a retainer 18, or any kind of retaining functional element to lock on the bottom of the base. The drive shaft 14 is the end of drive shaft 15; it is located inside of the cylinder body where other applications can be added using the retainer 18 functionality.

The base 30 and the female hexagon nut 45 are a one-piece solid design with a 1-inch thickness, and attach to the end of drive shaft. The hexagon nut assembly (10, 45) interfaces with the power source or engine 90. It cannot be decoupled from the cylindrical body 25 of the apparatus and must be molded into one piece.

When the base 30 is connected to the drive shaft 15, and power is provided by either gas, battery, solar, and/or electric power source or engine 90, the base spins and uses the full capacity of the line trimmer and shredder apparatus to cut weeds, clear vegetation, or remove snow accumulation.

Figure 5:
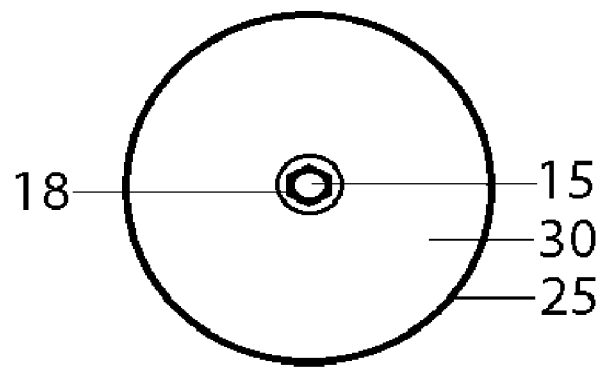
FIG. 5 on Sheet 5 is a top view of the cylindrical body of the apparatus. This is the same view as a bottom view of the base of the apparatus.

FIG. 5 is a top view of the cylindrical body 25 of the apparatus. This is the same view as a bottom view of the base of the apparatus.

In order to keep the apparatus from separating from the drive shaft or engine or motor, the apparatus uses a retainer 18, or may use any kind of retaining function element to lock on the bottom of the base 30.

Figure 6:
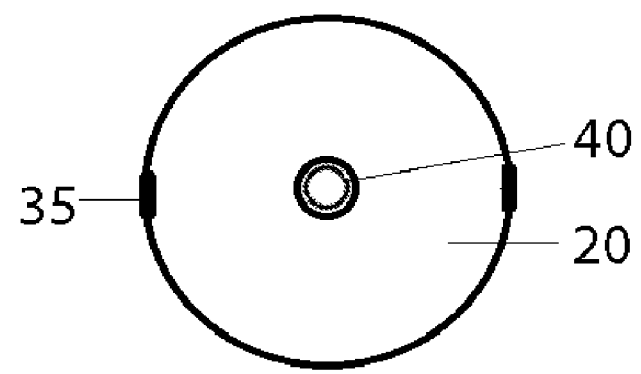
FIG. 6 on Sheet 5 is a top view of the cover of the apparatus.

FIG. 6 is a detailed top view of the cover of the apparatus. It is the internal top view of the cover in FIG. 2 displaying the center pipe 40 and the two prongs 35 where they are inserted into the prong insert holes 37.

Figure 7:
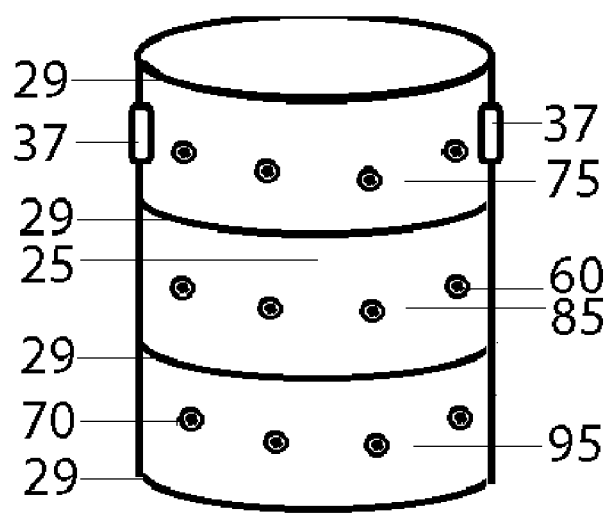
FIG. 7 on Sheet 6 illustrates a detailed side view of the cylindrical body of the apparatus.

FIG. 7 illustrates a side view of the cylindrical body of the apparatus. The cylindrical body 25 of the apparatus is a cylinder in shape, hollow inside, approximately 3 inches in height and approximately 2.5 inches in diameter. There are two prong insert holes 37 at the top of the cylindrical body at 180 degrees apart. The cylindrical body 25 has four marked solid lines 29 and that divide the cylindrical body into three sections: a top row section 75, a middle row section 85, and a bottom row section 95. This allows the user to select the rows to be used for the type of work to be done. The cylindrical body 25 has a coupling design. The eyelet holes 60 are reinforced with rivet eyelet holes 70, and can be of uniform size or of variable size, depending on the desired design of the cylindrical body. Each of the eyelet holes 60 may be designed to accommodate pre-molded or pre-made ornamental nail head string line of any length. For example, the user may choose to use a string line 6.5 inches in length.

The spacing of the eyelet holes on the cylindrical body design can vary. For example, all of the eyelet holes on the cylindrical body can be made to be 0.125 inches in size so that only nail head string lines that are thin enough to pass through holes of this size can be used. In addition, the eyelet holes may be spaced 1 inch apart in height and width; therefore, each sectioned row would have 8 eyelet holes, making 24 eyelet holes (8×3=24). In other words, there are 24 riveted eyelet holes (60, 70) on the cylindrical body 25; each section has 8 riveted eyelet holes (60, 70) (360°/45°=8), and each riveted eyelet holes (60, 70) is 2.49 cm apart (about 1 inch) from another. (This example design uses 45° for the riveted eyelet holes distribution). The distance between each hole on the cylindrical body surface is (3.1416×2.5)×2.54/(360/45)=2.49 cm (about 1 inch), whereas the size of the eyelet hole is 0.125 inches.

The number, length, and width of nail head string lines used on each section of the cylindrical body can be determined by the operator, who decides how many strings of a particular length and thickness are to be used according to the desired application, such as trimming grass or weeds, shredding grass or weeds, or as a snow accumulation remover. The size and distribution of the rivet holes may vary according to the size of the hole, and the number of rivet holes may be increased according to the size of the apparatus. If any nail head string line is damaged in use and needs to be replaced, the user will be able to easily replace the individual nail head string line.

The apparatus has a unique coupling design that can be customized by the user by selecting the number and type of nail head string lines to be used for the desired effort, such as trimming, shredding, or snow accumulation removal.

The cylindrical body eyelet holes may be reinforced with rivets of either metal or thicker material around the eyelet holes to prevent the holes from wearing due to friction between the nail head string line and the hole during usage.

Figure 8:
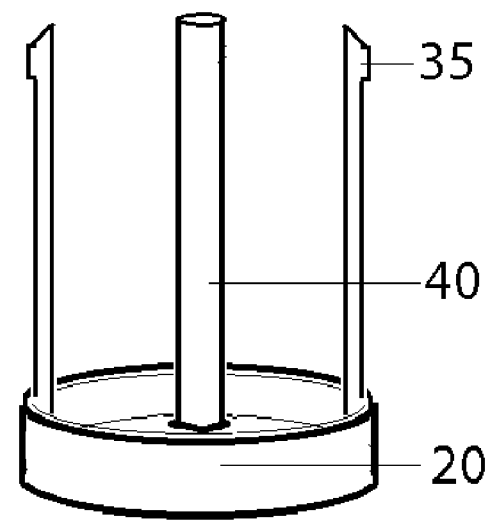
FIG. 8 on Sheet 6 illustrates a detailed side view of the cover of the apparatus. It is the cover of the cylindrical body.

FIG. 8 illustrates a side view of the cover 20 of the cylindrical body 25. The cover 20 has two prongs 35 located 180 degrees from each other at the bottom. The two prongs insert into the top prong insert holes 37 of cylindrical body 25 as shown in FIG. 7 and FIG. 1.

Figure 9:
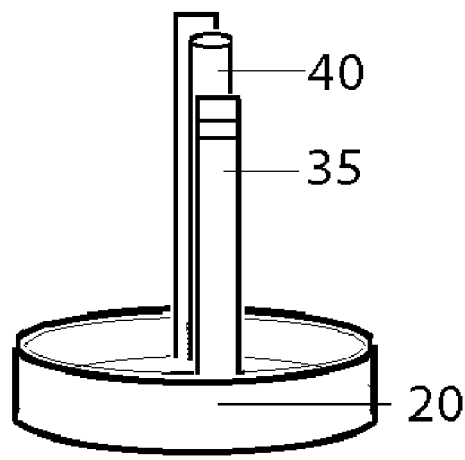
FIG. 9 on Sheet 7 illustrates a side view of the cover of the apparatus at a 90 degree angle from FIG. 8. It is the cover of the cylindrical body.

FIG. 9 illustrates a side view of the cover of the apparatus at a 90 degree angle from FIG. 8. It is the cover of the cylindrical body 20.

The cover has a center pipe 40 and two prongs 35. The center pipe 40 is hollow and is used to balance the apparatus when the engine or motor is spinning.

The center pipe 40 and two prongs 35 are 2.5 inches long, and the width of the prongs is 1.5 cm (about 0.6 inch).

Whenever the apparatus is spinning, the prongs lock and hold the cylindrical body securely in place, and the center pipe balances the end drive shaft 14 as it spins while the engine or motor is in use.

The cover 20 of the apparatus is approximately 0.5 inch thick and uses two prongs 35 to lock onto the cylindrical body 25 and base 30 to secure the nail head strings 101 in the cylindrical body 25. The cover 20 can be decoupled from the apparatus and is an independent piece, but must be coupled with the other 3 elements (the base 30, the cylindrical body 25, and a number of nail head strings 101) when the apparatus is in use.

To load the nail head string line, the cover 20 detaches from the cylindrical body 25. The nail head string line 101, is inserted into the riveted eyelet holes (60, 70) and is pushed through until the nail head string line does not go any further. Once the nail head string line is in place, you continue to insert a nail head string line in the next riveted eyelet hole (60, 70), until you have completed the row or rows being used for the application.

Figure 10:
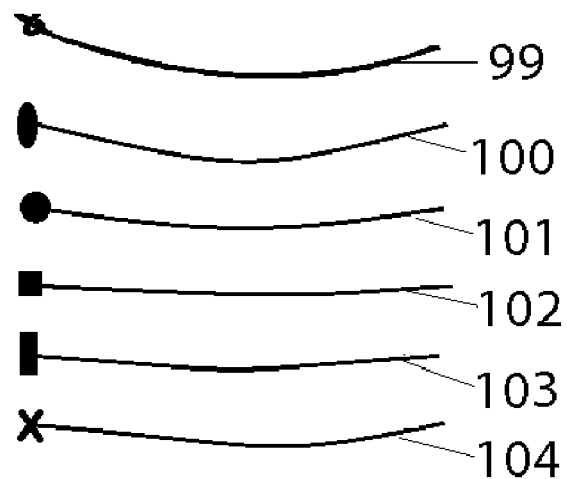
FIG. 10 on Sheet 7 illustrates samples of pre-molded or pre-made nail head string lines that can be designed to be used in the apparatus.

FIG. 10 illustrates samples of pre-molded or pre-made nail head string lines designated for use with the apparatus.

In FIG. 10, some samples (99, 100, 101, 102, 103, and 104) are shown of the pre-molded nail head string. The design is a "nail head" and a line segment of variable length and width made from any material. One end of the line segment ends with a pre-molded nail head, and it can be any shape as long as the size of the shape is larger than the size of the eyelet holes (60, 70). The line segment of the nail head string line can be of any length the user chooses; the line segment can be longer or shorter depending on the desired application. The line segment can be of any width that fits through the eyelet holes (60, 70), so the line segment can the thicker or thinner depending on the desired application. When the user inserts nail head string lines into the eyelet holes (60, 70), the nail head stays in the cylinder body while the line segment extends from the cylinder body. The nail head dimensions must be larger than the eyelet holes (60, 70) to secure the nail head in the cylinder body during operation and prevent the entire nail head string line from flying off the apparatus. The tool is designed for high performance with these pre-molded nail head strings.

The ornamental nail head string line used for the purpose of this apparatus can be a piece of pre-molded or pre-made line string of any length, of any width that fits through the eyelet holes (60, 70); its end has an ornamental nail head that cannot be found in the existing market. The design examples (99, 100, 101, 102, 103, and 104) are not a complete sketch of all possible nail head string lines. In order to have the string stay in the cylindrical body of the apparatus when the power source or engine runs, the ornamental nail head of the string line needs to be larger than the riveted eyelet holes, and the rest of the string line must fit through the hole. Basically, the nail head of the string line is larger in size than the riveted eyelet holes (60, 70).

The ornamental nail head string line designs (99, 100, 101, 102, 103, and 104) are some examples of nail head string lines. They are reserved for the apparatus to use. The sample string 101 is used to depict the nail head string line in the figures.

Figure 11:
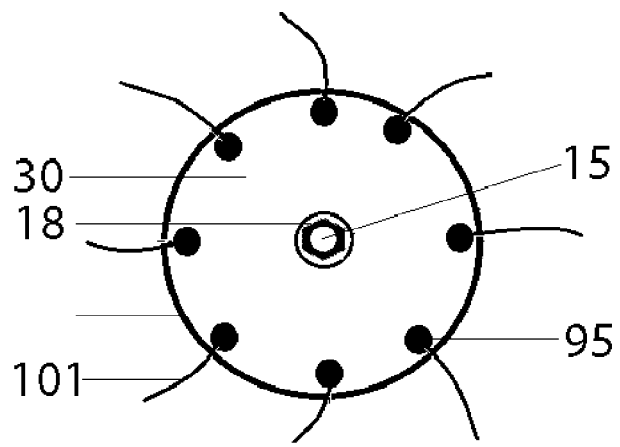
FIG. 11 on Sheet 8 illustrates a bottom view of the apparatus with pre-molded or pre-made nail head string lines inserted in the first section.

FIG. 11 illustrates a bottom view of the apparatus with pre-molded or pre-made nail head string lines 101 inserted in the bottom row section 95. Since the apparatus has multiple functions, the section or sections used determine the type of application.

Figure 12:
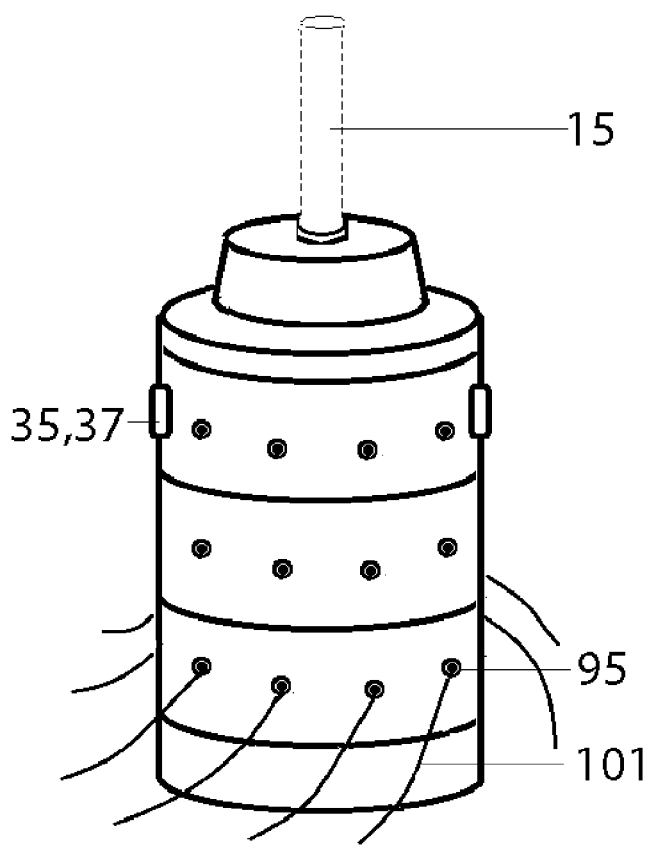
FIG. 12 on Sheet 8 illustrates the side view of the apparatus with pre-molded or pre-made nail head string lines inserted in the first section. It is the side view of FIG. 11.

FIG. 12 illustrates the side view of the apparatus with pre-molded or pre-made nail head string lines inserted in the bottom row section 95 of 8 eyelet holes on the cylindrical body that would be used in the case of grass or weed trimming. It is the side view of FIG. 11. As shown in FIG. 12, the user inserts nail head string lines 101 in the bottom row section 95 of 8 eyelet holes on the cylindrical body 25 for the apparatus to become a grass or weed trimmer.

Figure 13:
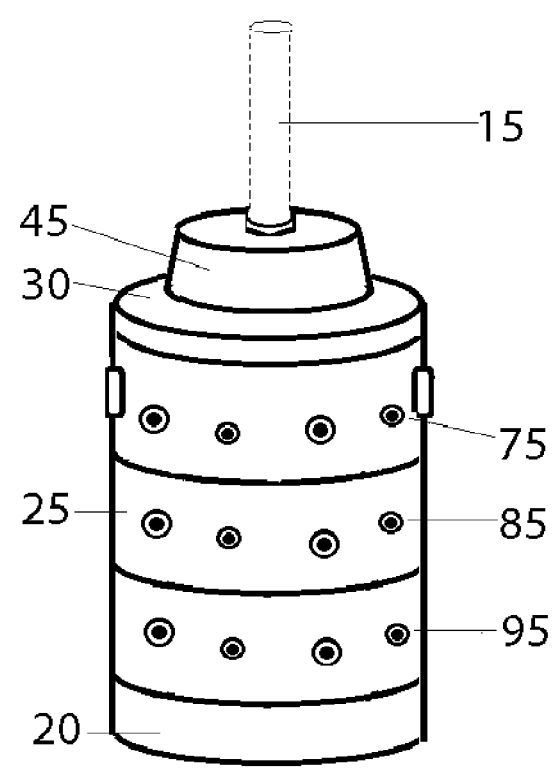
FIG. 13 on Sheet 9 illustrates a side view of the apparatus that shows an example of the cylindrical body with various sized holes.

FIG. 13 illustrates a side view of the apparatus that shows an example of the cylindrical body with various sized eyelet holes. The eyelet holes in the three sections (75, 85, 95) can all be the same size, but this example shows eyelet holes of various sizes in the sections. The varied eyelet hole size design allows the user to insert nail head string lines of different thicknesses for the desired application. When the user chooses to insert thin nail head string lines in only the small eyelet holes, it is used to trim grass or weeds; or, the user may choose to insert thicker nail head string lines only in the larger eyelet holes to cut dense areas of weeds. The user may even insert a combination of thick and thin nail head string lines in the corresponding sized eyelet holes to clear brush and very dense vegetation.

What is claimed is:

1. A spooless line trimmer attachment for trimming, shredding, and mulching vegetation, or removing snow accumulation that reversibly couples to a line trimmer, comprising:
    a. a hollow cylindrical body that reversibly couples to a head of the line trimmer,
    wherein the hollow cylindrical body includes a coupling means that couples the hollow cylindrical body to the head of the line trimmer,
    wherein the hollow cylindrical body further includes a top section, a middle section, and a bottom section,
    wherein the top section, middle section, and bottom section are stacked upon each other so that the middle section is stacked upon the bottom section and the top section is stacked upon the middle section,
    wherein the top section is formed onto the hollow cylindrical body closest to the coupling means,
    wherein the top section includes two or more eyelet holes formed for reversibly coupling a segment of nail head trimmer line into each of the two or more eyelet holes, wherein the two or more eyelet holes are positioned so that each of two or more eyelet holes is spaced 45 degrees from a closest eyelet hole of the two or more eyelet holes;
    wherein the middle section includes two or more eyelet holes formed for reversibly coupling a segment of nail head trimmer line into each of the two or more eyelet holes, wherein the two or more eyelet holes are positioned so that each of the two or more eyelet holes is spaced 45 degrees from a closest eyelet hole of the two or more eyelet holes;
    wherein the bottom section includes two or more eyelet holes formed for reversibly coupling a segment of nail head trimmer line into each of the two or more eyelet holes, wherein the two or more eyelet holes are positioned so that each of the two or more eyelet holes is spaced 45 degrees from a closest eyelet hole of the two or more eyelet holes; and
    b. segments of nail head trimmer line, wherein the segments of nail head trimmer line are inserted in at least two of the two or more eyelet holes of the top section, wherein the segments of nail head trimmer line are inserted in at least two of the two or more eyelet holes of the middle section, wherein the segments of nail head trimmer line are inserted in at least two or more eyelet holes of the bottom section, and wherein the segments of nail head trimmer line are of equal length.

2. The device of claim 1 wherein each of the two or more eyelet holes of the top section, the two or more eyelet holes of the middle section, and the two or more eyelet holes of the bottom section are 0.125 inches in diameter.

3. The device of claim 2, wherein each of the two or more eyelet holes is spaced 1 inch from a nearest hole of the two or more eyelet holes.

4. The device of claim 1, wherein there are eight segments of the segments of nail head trimmer line inserted into the top section, wherein there are eight segments of the segments of nail head trimmer line inserted into the middle section, and wherein there are eight segments of the segments of nail head trimmer line inserted into the bottom section.

5. The device of claim 1, wherein each eyelet hole of the two or more eyelet holes of the middle section is aligned below each eyelet hole of the two or more eyelet holes of the top section, and wherein each eyelet hole of the two or more eyelet holes of the middle section is aligned above each eyelet hole of the two or more eyelet holes of the bottom section.

6. The device of claim 1, wherein each of the two or more eyelet holes in the top section is positioned 45 degrees from the closest eyelet hole of the two or more eyelet holes of the top section, wherein each of the two or more eyelet holes in the middle section is positioned 45 degrees from the closest eyelet hole of the two or more eyelet holes of the middle section, and wherein each of the two or more eyelet holes in the bottom section is positioned 45 degrees from the closest eyelet hole of the two or more eyelet holes of the bottom section.

\* \* \* \* \*